US005517439A

United States Patent [19]
Suzuki et al.

[11] Patent Number: 5,517,439
[45] Date of Patent: May 14, 1996

[54] ARITHMETIC UNIT FOR EXECUTING DIVISION

[75] Inventors: Hidetoshi Suzuki; Toshihiro Ishikawa; Yukihiro Fujimoto, all of Yokohama; Noriaki Minamida, Matsuto, all of Japan

[73] Assignee: Matsushita Electric Industrial Co., Ltd., Osaka, Japan

[21] Appl. No.: 382,576

[22] Filed: Feb. 2, 1995

[30] Foreign Application Priority Data

Feb. 14, 1994 [JP] Japan ................................. 6-017184
Mar. 31, 1994 [JP] Japan ................................. 6-062653

[51] Int. Cl.⁶ ........................................................... G06F 7/52
[52] U.S. Cl. ............................................................... 364/766
[58] Field of Search ........................................ 364/766, 764, 364/761

[56] References Cited

U.S. PATENT DOCUMENTS

| | | | |
|---|---|---|---|
| 4,238,833 | 12/1980 | Ghest et al. | 364/766 |
| 4,405,992 | 9/1983 | Blau et al. | 364/766 |
| 4,872,214 | 10/1989 | Zurawski | 364/766 |
| 4,891,780 | 1/1990 | Miyoshi | 364/766 |
| 5,014,233 | 5/1991 | Kihava et al. | 364/766 |
| 5,016,210 | 5/1991 | Sprague et al. | 364/766 |
| 5,027,309 | 6/1991 | Koumoto et al. | 364/766 |
| 5,097,435 | 3/1992 | Takahashi | 364/766 |
| 5,131,081 | 7/1992 | MacKenna et al. | |
| 5,283,900 | 2/1994 | Frankel et al. | |
| 5,317,531 | 5/1994 | Zaidi | 364/766 |
| 5,317,736 | 5/1994 | Bowen . | |
| 5,339,413 | 8/1994 | Koval et al. | |

FOREIGN PATENT DOCUMENTS

| | | |
|---|---|---|
| 62-285137A | 12/1987 | Japan . |
| 2138621A | 5/1990 | Japan . |
| 1551896 | 9/1979 | United Kingdom . |
| 2239536 | 7/1991 | United Kingdom . |
| 2265739 | 10/1993 | United Kingdom . |
| 2268604 | 1/1994 | United Kingdom . |

OTHER PUBLICATIONS

Motorola, Inc.; "Digital Signal Processor User's Manual"; DSP56116; 1990; pp. A73–A76.

Primary Examiner—Tan V. Mai
Attorney, Agent, or Firm—Watson Cole Stevens Davis

[57] ABSTRACT

An arithmetic unit includes an arithmetic and logic circuit having n bits and capable of controlling the execution of either addition or subtraction by responding to a signal indicative of a positive or negative sign of a result of one preceding calculation, a register of n bits for temporarily storing data delivered out of the arithmetic and logic circuit, a register of n bits for delivering a divisor to the arithmetic and logic circuit, a shift register of n stages for sequentially storing signals indicative of a positive or negative sign of results of calculation by the arithmetic and logic circuit, and a shifter for shifting data of the register by one bit to the left and inserting data of the most significant bit of the shift register into the least significant bit to provide an output which in turn is delivered to the arithmetic and logic circuit. A conventional shifter having a bit length of 2n can be replaced with the shifter having a bit length of n and the shift register having a bit length of n.

4 Claims, 5 Drawing Sheets

ARITHMETIC UNIT FOR EXECUTING DIVISION

BACKGROUND OF THE INVENTION

The present invention relates to an arithmetic unit included in a digital signal processor to execute division operations.

Recently, with the trend toward introduction of digital systems into the field of mobile communications, the digital signal processor (hereinafter simply referred to as DSP) has been highlighted as a processor to be built in such an apparatus as a portable telephone.

In the digital mobile communications as described above, low power consumption aiming at prolongation of the operation time of a battery used and an improvement in the throughput for execution of a complicated application program in, for example, a voice codec are required of the DSP. Reduction in costs is also required of the DSP.

In the DSP, division is sometimes executed by using a nonrestoring division algorithm (see, for example, "DSP 56116 Digital Signal Processor User's Manual" by Motorola Inc., 1990). An example of a prior art arithmetic unit for dividing data of predetermined n bits by data of n bits pursuant to the nonrestoring division algorithm will be described hereunder with reference to a schematic block diagram shown in FIG. 5.

In FIG. 5, a register 101 having a length of n bits holds a divisor. A register 102 having a length of 2n bits holds "0" at its upper n bits and a dividend at its lower n bits. A shifter 103 shifts data from the register 102 by one bit to the left. In the shifter 103, the least significant bit is initially inserted with "0" and subsequently inserted with an inversion of a positive or negative sign signal indicative of a result of calculation. The upper n bits are delivered to an arithmetic and logic circuit 104 to be described later, and the lower n bits are delivered to the lower bits of the register 102. The arithmetic and logic circuit 104 having a bit length of n is connected to the register 101 and shifter 103, and it performs addition or subtraction in accordance with a signal indicative of positive or negative sign from the register 102 and delivers a result of calculation to the upper n bits of the register 102.

The arithmetic unit constructed as described above and its operation to execute division will be detailed below.

Firstly, the arithmetic and logic circuit 104 decides whether of data held by the register 102 is positive or negative. When the data is positive, it is meant thereby that a divisor could be subtracted. When the data is negative, an operation of shifting the data by one bit to the left and adding the divisor will result in the same calculation as subtraction executed at the data shifted to the left by one bit. Accordingly, the data held by the register 102 is shifted by one bit to the left by means of the shifter 103. After being shifted, in the initial step the least significant bit of the shifter 103 is fulfilled with "0" and in a subsequent step it is inserted with an inversion of a positive or negative signal indicative of a result of calculation. As a result of shifting, the upper n bits correspond to a remainder of an upper digit portion of a dividend and they are delivered to the arithmetic and logic circuit 104. As a result of shifting, the lower n bits correspond to a lower digit portion of the dividend and a number indicative of a quotient result up to the current step and they are delivered to the register 102. Next, if the initially decided value of the register 102 is negative, the value of the register 101 and an output of the shifter 103 are added together by means of the arithmetic and logic circuit 104. If the decided value of the register 102 is non-negative, the value of the register 101 is subtracted from the output of the shifter 103 by means of the arithmetic and logic circuit 104 and a result is stored in the register 102. Thereafter, the sign of the data in the register 102 is again decided. The above operation is repeated (n–1) times and finally, the positive or negative sign of the register 102 is decided. If negative, "0" is set to the least significant bit of the register 102 and if non-negative, "1" is set. As a result, a quotient is stored at the lower n bits of the register 102.

In the prior art example of an arithmetic unit, however, the shifter 103 is required to have a bit length of 2n and a path extending from the shifter 103 to the register 102 is needed, thus increasing the amount of hardware.

Further, which one of addition and subtraction the arithmetic and logic circuit 104 is to perform is controlled by a signal indicative of the positive or negative sign of data held by the register 102, thus making the control operation complicated. In order to realize the complicated control operation, large amount of hardware is needed. The large-sized hardware makes the DSP expensive and has many operating portions, raising a problem that consumptive power is increased.

SUMMARY OF THE INVENTION

The present invention contemplates elimination of the above prior art problems, and it is an object of the present invention to provide an arithmetic unit which can execute division based on nonrestoring division algorithm with small-sized hardware and therefore can reduce costs and consumptive power. The arithmetic unit can also execute efficiently the Viterbi decoding processing which is the processing for decoding an error-correcting code.

To accomplish the above object, an arithmetic unit of the invention for execution of division comprises arithmetic means having predetermined n bits and capable of controlling the execution of either addition or subtraction by responding to a signal indicative of positive or negative of a result of one preceding calculation instead of a sign of data in a register, first memory means for temporarily storing data delivered out of the arithmetic means, second memory means of n bits for delivering calculation data to the arithmetic means, a shift register of n stages for sequentially storing signals indicative of a positive or negative sign of results of calculation by the arithmetic means, and a shifter for shifting data of the first memory means by one bit to the left and inserting data of the most significant bit of the shift register into the least significant bit to provide an output which in turn is delivered to the arithmetic means.

Another arithmetic unit of the present invention for accomplishing the above object comprises arithmetic means for performing addition of predetermined n bits, first memory means for temporarily storing data delivered out of the arithmetic means, second and third memory means for storing calculation data, selection means responsive to a signal indicative of positive or negative sign of a result of calculation by the arithmetic means to select data from any one of the second and third memory means and deliver the selected data to an input of the arithmetic means, a shift register for sequentially storing signals indicative of positive or negative sign of results of calculation by the arithmetic means, and a shifter for shifting data of the first memory means by one bit to the left and inserting data of the most significant bit of the shift register into the least significant bit to provide an output which in turn is delivered to the arithmetic means.

Then, in the arithmetic unit, a register can be used as the memory means and a multiplexer can be used as the selection means.

According to the present invention, since the shift register sequentially stores data of positive and negative signs of the data delivered out of the arithmetic means and inserts a signal in the most significant bit into the least significant bit of the shifter, the conventional shifter having a bit length of 2n can be replaced with the shifter having a bit length of n and the shift register having a bit length of n. As a result, the size of the shifter can be reduced and the path extending from the shifter to the first memory means can be dispensed with.

When a divisor is stored in one of the second and third memory means, a 2'complement of the divisor is stored in the other and the selection means responds to a signal indicative of positive or negative sign of a calculation result to select data to be supplied, the arithmetic means is allowed to always perform addition. This permits the arithmetic means to always perform the same operation, thus facilitating the control operation.

DESCRIPTION OF THE PREFERRED EMBODIMENTS (Embodiment 1)

A first embodiment of the present invention will now be described with reference to FIG. 1.

Figure 1:
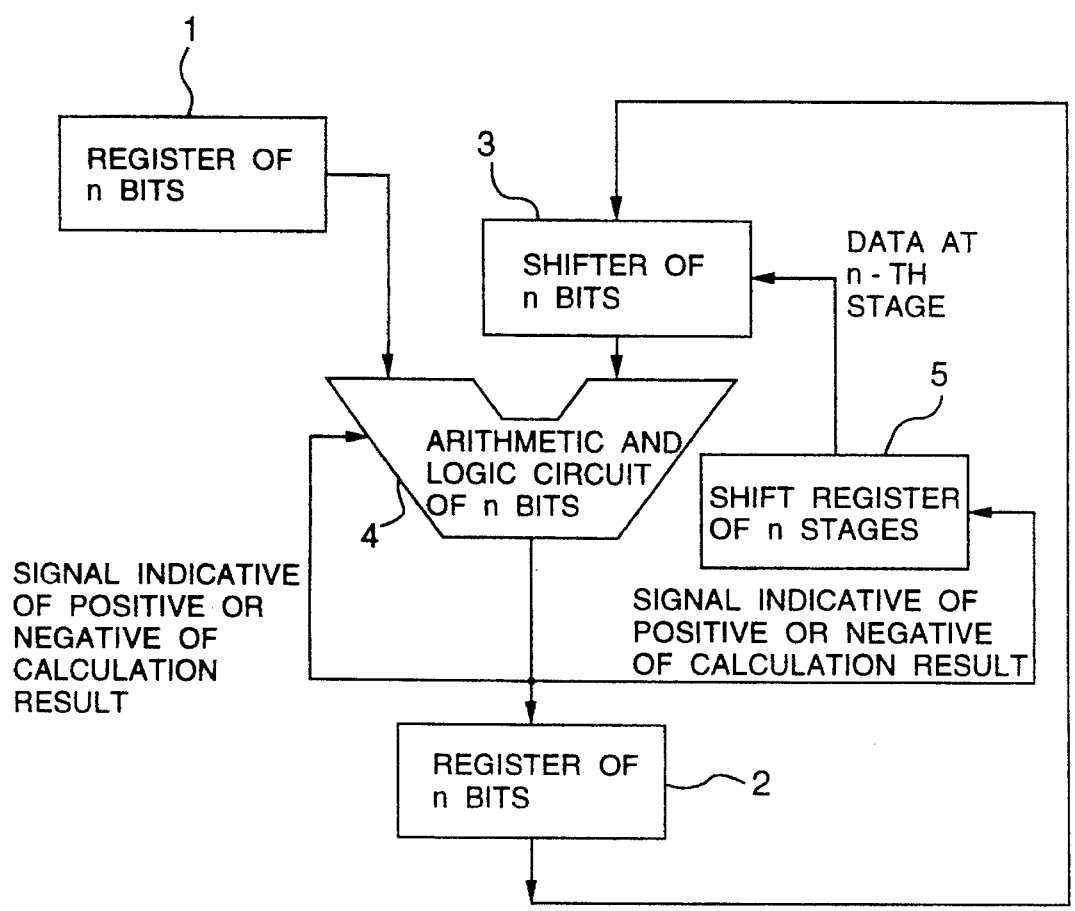
FIG. 1 is a schematic block diagram showing an arithmetic unit according to a first embodiment of the present invention.

Referring to a schematic block diagram of FIG. 1 showing an arithmetic unit according to the first embodiment of the present invention, a register 1 having a bit length of n and connected to an arithmetic and logic circuit 4 holds a divisor. A register 2 having a bit length of n and connected on the one hand to receive an output of the arithmetic and logic circuit 4 and on the other hand to a shifter 3 holds "0" initially. The register 3 shifts data of the register 2 by one bit to the left and inserts data from the n-th stage of a shift register 5 into the location of the least significant bit. The arithmetic and logic circuit 4 having a bit length of n performs addition when data in the register 2 is negative but performs subtraction when non-negative and stores a result of calculation into the register 2. Also, the arithmetic and logic circuit 4 delivers a signal indicative of a positive or negative sign of a calculation result to the shift register 5. The shift register 5 of n stages receives the signal indicative of the positive or negative sign of a calculation result and delivered out of the arithmetic and logic circuit 4 and is connected at the n-th stage to the shifter 3 to insert data into the location of the least significant bit when the shifter 3 executes a one-bit left shift. The shift register 5 is provided with a dividend initially.

A division operation carried out with the arithmetic unit constructed as above will be described hereunder in greater detail.

Initially, a divisor is stored in the register 1 and a dividend is stored in the shift register 5, as described above. The register 2 initially stores a "0".

(1) Firstly, as the shifter 3 shifts data supplied from the register 2 by one bit to the left, it receives at the least significant bit a value of the most significant bit of the shift register 5. In the initial step, the register 2 stores a with "0", the shifter 3 shifts this data by one bit to the left, and the value of the most significant bit of the shift register 5 is inserted in the least significant bit of the shifter 3. Consequently, the content of the shift register 3 is non-negative without fail.

(2) Next, a value of the register 1 is subtracted from an output of the shifter 3 by means of the arithmetic and logic circuit 4.

(3) Next, if a result of calculation in the above item (2) is non-negative, signifying that a remainder at that stage is larger than the divisor, "1", namely an inversion of sign bit, is supplied to the shift register 5 and the data is shifted by one bit. On the other hand, if a result of calculation in (2) is negative, signifying that the remainder is smaller than the divisor and the result becomes negative, "0", namely an inversion of sign bit, is supplied to the shift register 5 and then the data is shifted to the left by one bit. An output of the arithmetic and logic circuit 4 is stored in the register 2.

(4) Next, the shifter 3 shifts data supplied from the register 2 by one bit to the left and thereafter a value of the most significant bit of the shift register 5 is inserted into the least significant bit of the shifter 3.

(5) Next, if a result of one preceding calculation is non-negative, subtraction between the value of the register 1 and an output of the shifter 3 is carried out by means of the arithmetic and logic circuit 4. On the other hand, if a result of one preceding calculation is negative, addition of the value of the register 1 and an output of the shifter 3 is carried out by means of the arithmetic and logic circuit 4. Results of calculation are stored in the register 2.

(6) Next, if the result of calculation in step (5) above is non-negative, "1", e.i., an inversion of sign bit, is inserted into the shift register 5 and then the data is shifted by one bit. On the other hand, if the result of calculation in step (5) is negative, "0", e.i., an inversion of sign bit, is inserted into the shift register 5 and then the componed data is shifted by one bit.

(7) The operation carried out through the above steps (4), (5) and (6) are repeated (n–2) times.

(8) Finally, the arithmetic and logic circuit 4 decides whether the register 2 is positive or negative. If negative, "0" is set to the least significant bit of the register 2 but if non-negative, "1" is set thereto.

In this manner, division is executed and a quotient is stored in the shift register 5.

While in the prior art a shifter having the bit length which is twice the bit length of data standing for a divisor or dividend is needed, it suffices according to the present embodiment that the bit length of the shifter 3 can equal the bit length of data standing for a divisor or dividend and also the direct path between the shifter 3 and the register 2 can be dispensed with.

(Embodiment 2)

A second embodiment of the present invention will now be described with reference to the accompanying drawing, FIG. 2.

Figure 2:
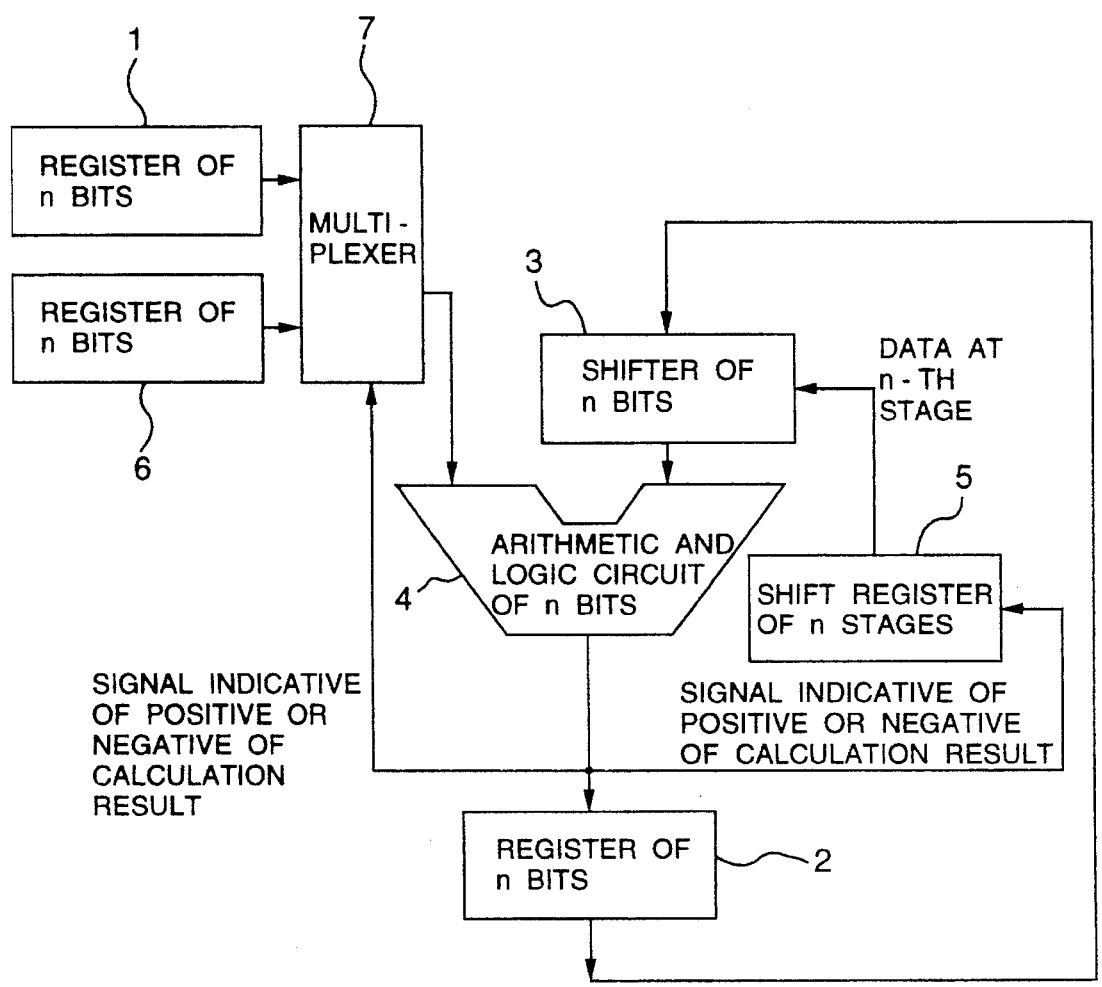
FIG. 2 is a schematic block diagram showing an arithmetic unit according to a second embodiment of the present invention.

Referring to a schematic block diagram showing an arithmetic unit according to the second embodiment of the present invention, the present embodiment features the additional provision of a multiplexer 7 which selects one of the outputs of registers 1 and 6 in accordance with a result of decision as to whether the register 2 is positive or negative, as shown in FIG. 2.

In the foregoing first embodiment, the positive or negative sign of one preceding calculation is decided and the arithmetic and logic circuit 4 performs addition or subtraction in accordance with a result of this decision. In the present embodiment, however, a divisor is initially stored in the register 1 and a 2's complement of the divisor is initially stored in the register 6. Then, the multiplexer 7 for performing selection in accordance with positive or negative sign of one preceding calculation is controlled so that the arithmetic and logic circuit 4 may be allowed to always execute addition.

The remaining components are identical to those of the foregoing first embodiment and like components designated by like reference numerals will not be described.

With the above construction, the present embodiment operates partly differently from the first embodiment as will be described below.

More particularly, if a result of the preceding calculation is negative in the aforementioned step (5), the multiplexer 7 selects the register 1 holding the divisor to deliver a value of register 1 which in turn is added to an output of the shifter 3 by means of the arithmetic and logic circuit 4. On the other hand, if a result of the preceding calculation is non-negative in the aforementioned step (5), the multiplexer 7 selects the register 6 holding the 2's complement of the divisor to deliver a value of register 6 which in turn is added to an output of the shifter 3 (equivalently, subjected to subtraction from the output of the shifter 3) by means of the arithmetic and logic circuit 4.

In the present embodiment, the arithmetic and logic circuit 4 always carries out additions but not subtractions for a division operation and therefore its hardware can be simplified.

As described above, according to the present invention, the size of the shifter can be reduced and the direct path extending from the shifter to the register can be dispensed with. Accordingly, division can be effected with small-sized hardware, thereby ensuring that the size of the operational part can be minimized and consumptive power can be reduced.

In addition, by allowing the arithmetic and logic means to always perform additions for executing a division, the control circuit can be simplified.

(Embodiment 3)

A third embodiment of the present invention will now be described with reference to the accompanying drawings.

Figure 3:
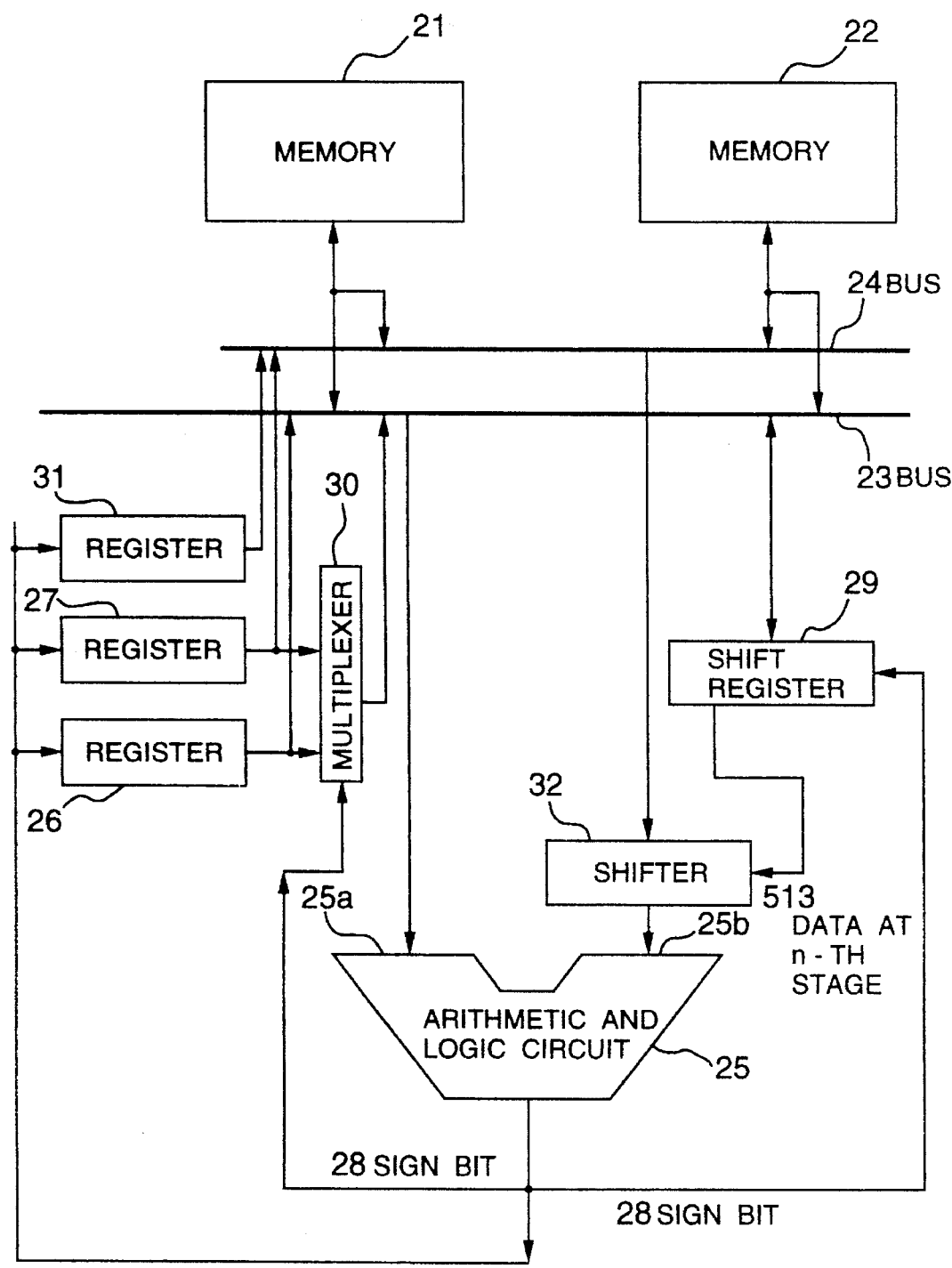
FIG. 3 is a schematic block diagram showing an arithmetic unit according to a third embodiment of the present invention.

FIG. 3 is a schematic block diagram showing an arithmetic unit according to a third embodiment of the present invention.

As shown in FIG. 3, the present embodiment features the additional provision of a register 31 and two memories. In other words, the present embodiment differs from the foregoing second embodiment in that memories from which two kinds of data usually provided for the DPS can be read simultaneously and three or more general-purpose registers are used.

In connection with the above construction, a Viterbi algorithm for the error-correcting processing will first be described.

In the DSP adapted to realize a voice coding apparatus for digital mobile communications, the error-correcting processing must be performed in addition to such an operation as the voice coding processing. Some error-correcting methods use Viterbi decoding.

The Viterbi algorithm is for realizing maximal likelihood decoding of a convolutional code by repeating simple processings of addition, comparison and selection. In the Viterbi decoding, each time that coded data (receiving series) corresponding to one bit of information bits are obtained, a cumulative amount of surviving paths associated with each state at that time (hereinafter referred to as a path metric) is calculated and updated.

Figure 4:
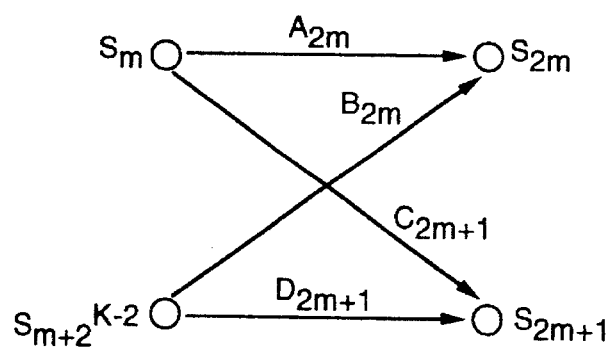
FIG. 4 is a diagram showing paths of state transition in a convolutional encoder for use in Viterbi decoding.
Figure 5:
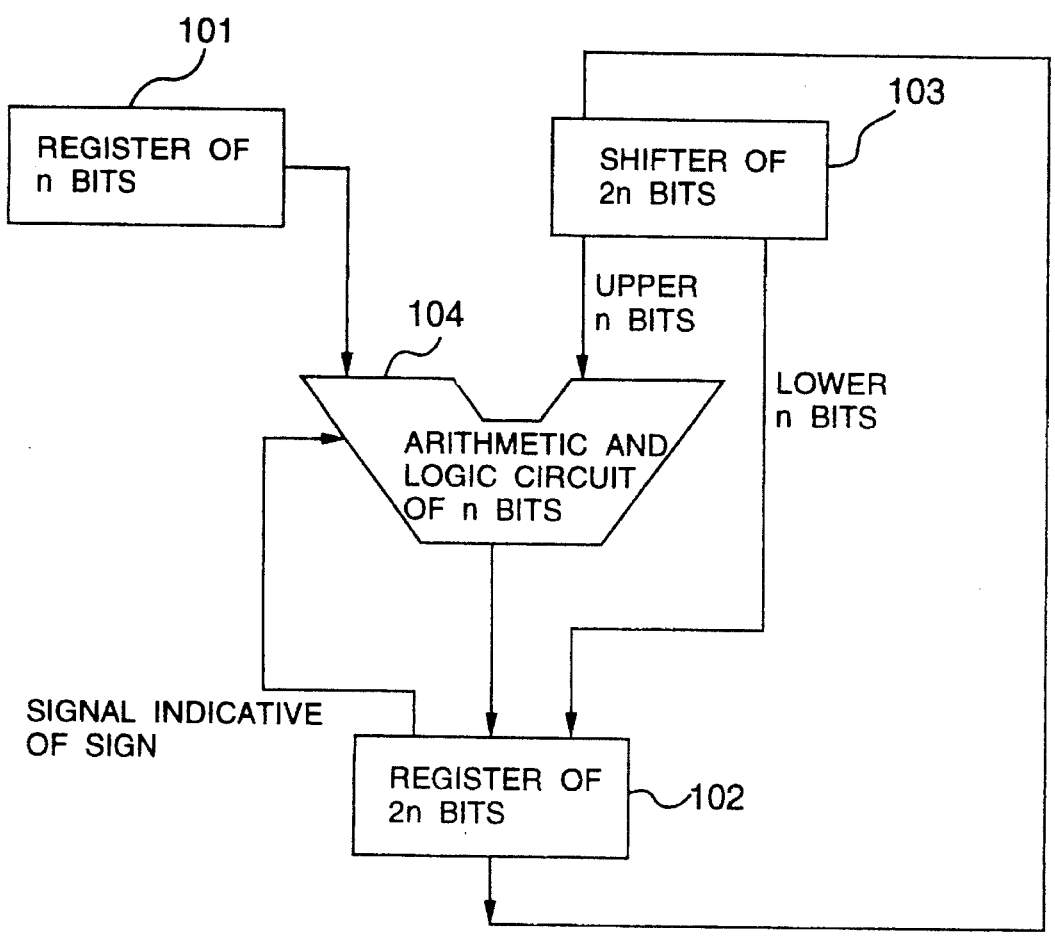
FIG. 5 is a schematic block diagram showing a prior art arithmetic unit.

FIG. 4 shows a phase in which two paths indicative of state transition extend from one preceding states Sm and $S(m+2)^{k-2}$ to states S2m (m being positive integer) and S2m+1 at a certain time point, respectively, in a convolutional coder of constraint length K. Denoted by A2m or B2m is a Hamming distance between output symbol and receiving series of each path coming to the state S2m (hereinafter referred to as a branch metric). Denoted by C2m+1 or D2m+1 is a path metric of each path coming to the state S2m+1. Selection of a path is carried out as follows.

Values of individual branch metrics calculated in advance and values of path metrics of paths surviving at one preceding time point are respectively added together to calculate a total metric of each path. Path metrics of the two paths coming to the state S2m are compared to each other and one path which is smaller in the total of Hamming distances is caused to remain and the other is discarded. Thus, in the decoding of convolutional code based on the Viterbi algorithm, operations of addition, comparison and selection and path metrics must be memorized for 2k−1 states in each time series in connection with addition of branch metrics and path metrics of inputs remaining until one preceding time point, comparison of results of addition and selection of an optimum path.

An example of a prior art arithmetic unit for performing Viterbi decoding will now be described with reference to a schematic block diagram shown in FIG. 6.

Figure 6:
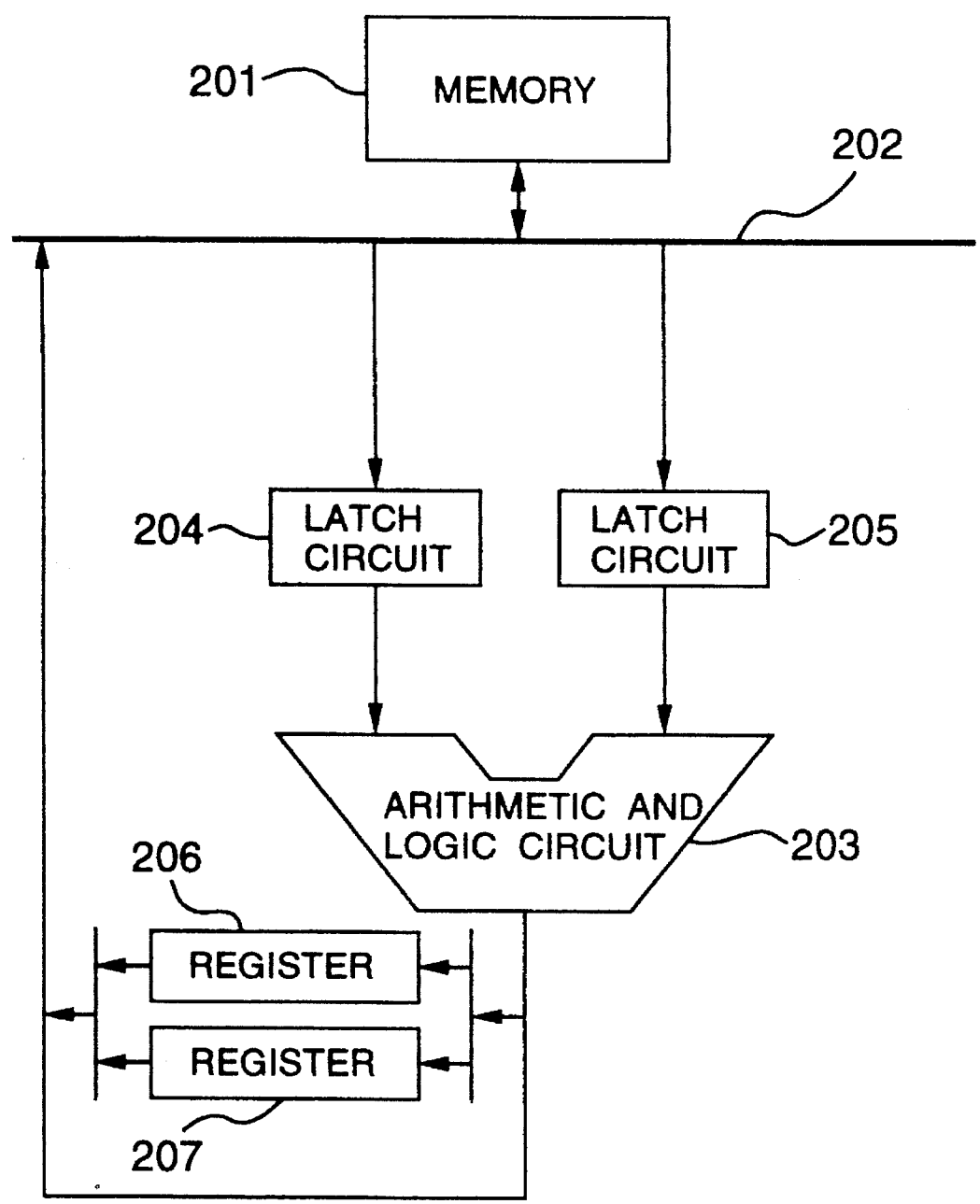
FIG. 6 is a schematic block diagram showing a prior art arithmetic unit for use in Viterbi decoding.

In FIG. 6, a memory 201 stores instruction words of a processor and a metric (cumulative amount) of paths associated with each state, a table of values of branch metrics which individual paths assume for a value of coded data (receiving series) corresponding to one bit of information bits and a result of selection of a surviving path associated with each state in Viterbi decoding. A bus 202 is coupled to the memory 201 to participate in supplying data and storing calculation results, an arithmetic and logic circuit 203 performs arithmetic and logic operations, latch circuits 204 and 205 temporarily store left-hand and right-hand input values to the arithmetic and logic circuit 203, respectively, and registers 206 and 207 temporarily store calculation results.

In the arithmetic unit constructed as described above, the operation for updating path metrics associated with the state S2m in FIG. 4 and the operation for storing a path selection signal are carried out by applying addition, comparison and selection operations of Viterbi decoding to one receiving series in accordance with the following six steps.

(1) First Addition Step of Path Metric and Branch Metric

A value of a path metric associated with the state Sm shown in FIG. 4 is transferred from the memory 201 to the latch circuit 204 through the bus 202 and similarly, a value of branch metric A2m is transferred from the memory 201 to the latch circuit 205 through the bus 202. The arithmetic and logic circuit 203 adds the contents of the latch circuit 204 and the contents of the latch circuit 205 together and a result of addition is stored in the register 206.

(2) Second Addition Step of Path Metric and Branch Metric

A value of a path metric associated with the state $S(m+2)^{k-2}$ is transferred from the memory 201 to the latch circuit 204 through the bus 202 and similarly, a value of branch metric B2m is transferred from the memory 201 to the latch circuit 205 through the bus 202. The arithmetic and logic circuit 203 adds the contents of the latch circuit 204 and the contents of the latch circuit 205 together and a result of addition is stored in the register 207.

(3) Subtraction (Magnitude Comparison) Step of Two Addition Results

The contents of the register 206 and the contents of the register 207 are transferred to the latch circuits 204 and 205, respectively. The contents stored in the latch circuit 204 and that stored in the latch circuit 205 are calculated by means of the arithmetic and logic circuit 203. A result of subtraction is not stored in the memory.

(4) Decision (Selection) Step of Sign of Subtraction Result

A controller (not shown) decides the sign of the result of subtraction in the above step (3) and performs program control (branching) in the following steps (5) and (6).

(5) Storing (Updating of Path Metric) Step of Subtraction Result Decided to be Small If the subtraction result in the above step (3) is determined to be negative as a result of the decision in the above step (4), the contents of the register 206 is stored in the memory 201. If the subtraction result in the step (3) is positive, the contents of the register 207 is stored in the memory 201.

(6) Storing Step of Bus Selection Signal

If the subtraction result in the step (3) is determined to be negative as a result of the decision in the step (4), the value "0" is stored in the memory 201. If the subtraction result in the step (3) is positive, the value "1" is stored in the memory 201.

The above six steps are repeated 2k−1 times to update path metrics of all states.

Thus, in the prior art arithmetic unit, the addition and comparison in the Viterbi decoding are carried out in the arithmetic and logic circuit 203 and the program control is effected in accordance with a comparison result to perform the Viterbi decoding processing.

A third embodiment of the present invention directed to execution of the Viterbi decoding and the division will now be described with reference to the accompanying drawings. FIG. 3 is a block diagram showing an arithmetic unit according to the third embodiment of the present invention.

In FIG. 3, a first memory 21 stores a cumulative amount (path metric) of surviving paths associated with each state in Viterbi decoding and a result of selection of a surviving path associated with each path (path selection signal), a second memory 22 stores in advance a table of values of Hamming distances (branch metrics) which the individual paths assume for a value of coded data (receiving series) corresponding to information bit one, a bus 23 is coupled to the memories 21 and 22, a left-hand input 25a of an arithmetic and logic circuit 25, a register 26, a shift register 29 and a multiplexer 30 to supply data to the left-hand input 25a of the arithmetic and logic circuit 25 or the shift register 29, and a bus 24 is coupled to the memories 21 and 22, a register 27, a register 31 and a shifter 32 to supply data to the input of the shifter 32.

The arithmetic and logic circuit 25 stands for arithmetic means for performing arithmetic operation and logic operation of data supplied to the buses 23 and 24 and each of the registers 26 and 27 temporarily stores a result of calculation by the arithmetic and logic circuit 25. Denoted by 28 is the most significant bit of a calculation result which stands for a sign bit corresponding to a path selection signal or a quotient for each bit in the division. The shift register 29 stores the sign bit 28 during the Viterbi decoding or a dividend during execution of the division based on the nonrestoring division algorithm. The multiplexer 30 serves as a selection means for selecting the register 26 when the sign bit 28 is "0" but the register 27 when the sign bit 28 is "1" and applying an output to the bus 23. The register 31 temporarily stores a divisor during execution of the division or a result of calculation by the arithmetic and logic circuit 25, and the shifter 32 receives data from the bus 24 and is operative to select shifting the data by one bit to the left or passage of the data, thereby delivering an output supplied to a right-hand input 25b of the arithmetic and logic circuit 25. During the one-bit left shifting, the shifter 32 shifts data on the bus 24 by one bit to the left and inserts data at the n-th stage of the shift register 29 into the least significant bit of the shifter 32.

In the present embodiment, the predetermined number of bits of the memories 21 and 22, buses 23 and 24, registers 26, 27 and 31 and shift register 29 is n.

The arithmetic unit constructed as above operates during the Viterbi decoding or the division based on the nonrestoring division algorithm as will be described below with reference to FIGS. 3 and 4.

Firstly, operation in the Viterbi decoding will be described.

Addition, comparison and selection operations for calculating and updating a cumulative amount (path metric) of surviving paths associated with the state S2m at a time point shown in FIG. 4 and operation for storing a path select signal will be described through four steps which are (1) a first addition step of path metrics and branch metrics for paths directed to the state S2m, (2) a second addition step for paths directed to the state S2m, (3) a step for comparing a result of the first addition with a result of the second addition and (4) a step for transferring a result of the comparison to the memories. The above four steps are executed repetitively by updating the value of m one by one. A cumulative amount of surviving paths toward the state S2m+1 is calculated similarly.

(1) First Addition Step of Path Metrics and Branch Metrics for Path Directed to State S2m A value Mm of a path metric associated with the state S2m shown in FIG. 4 is read out of the memory 21 and supplied to the left-hand input 25a of the arithmetic and logic circuit 25 through the bus 23. At the same time, a value A2m of a branch metric corresponding to a value of receiving series is read out of the memory 22 and supplied to the right-hand input 25b of the arithmetic and logic circuit 25 through the bus 24 and shifter 32. At that time, the shifter 32 does not operate and simply passes data therethrough. The arithmetic and logic circuit 25 adds data received at the right-hand input 25b and data received at the left-hand input 25a and stores a result of addition in the register 26.

(2) Second Addition Step of Path Metrics and Branch Metrics for Paths Directed to State S2m A value $M(m+2)^{k-2}$ of a path metric associated with the state $S(m+2)^{k-2}$ is read out of the memory 21 and supplied to the left-hand input 25a of the arithmetic and logic circuit 25 through the bus 23. At the same time, a value B2m of a branch metric corresponding to a value of receiving series is read out of the memory 22 and supplied to the right-hand input 25b of the arithmetic and logic circuit 25 through the bus 24 shifter 32. At that time, the shifter 32 does not operate and simply passes data therethrough. The arithmetic and logic circuit 25 adds data received at the right-hand input 25b and data received at the left-hand input 25a and stores a result of addition in the register 27.

(3) Step for Comparing a Result of the First Addition with a Result of the Second Addition Data stored in the register 26 as a result of the first addition is read out and applied to the left-hand input 25a of the arithmetic and logic circuit 25 through the bus 23. Concurrently, data stored in the register 27 as a result of the second addition is read out and applied to the right-hand input 25b of the arithmetic and logic circuit 25b of the arithmetic and logic circuit 25 through the bus 24 and shifter 32. At that time, the shifter 32 does not operate and simply passes data therethrough. The arithmetic and logic circuit 25 subtracts data at the left-hand input 25a from data at the right-hand input 25b and stores a sign bit 28 of the subtraction result, serving as a path selection signal, in the shift register 29. Concurrently therewith, the path selection signal is supplied to the multiplexer 30.

(4) Step for Transferring Comparison Result to Memories

The register 26 or 27 is selected by the multiplexer 30 to provide a path metric of surviving path which in turn is stored in the memory 21 through the bus 23.

As described above, by repeating the aforementioned four steps by 2k−1 by increasing the value of m one by one from 0, path metrics of surviving paths associated with 2k−1 states at a certain time can be calculated and updated. Each time that the four steps are repeated by n, the value of the shift register 29 is stored in the memory 21 through the bus 23.

According to the present embodiment, one cycle of addition, comparison and selection operations which is carried out through six steps in the prior art can be executed through the above four steps.

In addition, the path selection signal of one bit which is stored at one word of the memory in the prior art can be stored in the form of a smaller memory word number which is 1/n of that of the prior art by storing the path selection signal at a time point that n bits are stored in the shift register 29.

Furthermore, the arithmetic and logic circuit 25 and registers 26 and 27 constituting the present embodiment and used for addition, comparison and selection in the Viterbi decoding are usually provided precedently for the purpose of numerical calculation in a digital signal processor and the like and therefore, the arithmetic unit can advantageously be realized by adding only a slight amount of hardware including the shift register 29 and the multiplexer 30.

Operation in the division based on the nonrestoring division algorithm will now be described.

Firstly, a divisor is stored in the register 26 and a 2'complement of the divisor is stored in the register 27. The register 31 initially stores a "0" and the shift register 29 stores with a dividend. Each of the dividend and divisor is allowed to take only a positive numeral. Division is then effected as follows.

(1) Data of the register 31 is supplied to the shifter 32 through the bus 24. The shifter 32 shifts the supplied data by one bit to the left and inserts a value of the most significant bit of the shift register 29 into the least significant bit of the shifter 32.

(2) With the register 31 initially set with a "0", one-bit left shifting is effected to insert the most significant bit of the shift register 29 into the least significant bit and hence the register 31 has a value which is non-negative without fail. Then, a value of the register 27 holding the 2's complement of a dividend and an output of the shifter 32 are added together by means of the arithmetic and logic circuit 25 (in other words, subtraction of the divisor is effected).

(3) If a result of calculation in the above step (2) is non-negative, the shift register 29 receives a "1", that is, an inversion of the sign bit 28 to shift it. If a result of calculation in the above step (2) is negative, the shift register 29 receives a "0", that is, an inversion of the sign bit 28 to shift it.

(4) Data in the register 31 are supplied to the shifter 32 through the bus 24. The shifter 32 shifts the supplied data by one bit to the left and inserts a value of the most significant bit of the shift register 29 into the least significant bit of the shifter 32.

(5) If a result of one preceding operation is non-negative, a value of the register 27 holding a 2's complement of the divisor and an output of the shifter 32 are added together by means of the arithmetic and logic circuit 25 (corresponding to subtraction of the divisor). If a result of one preceding operation is negative, a value of the register 26 holding the divisor and an output of the shifter 32 are added together by means of the arithmetic and logic circuit 25 (corresponding to addition of the divisor). At that time, the multiplexer 30 selectively reads out either one of the registers 27 and 26. A result of addition is stored in the register 31.

(6) If a result of calculation in the above step (5) is non-negative, the shift register 29 receives a "1", that is, an inversion of the sign bit 28 to shift it. If a result of calculation in the above (5) is negative, the shift register 29 receives a "0", that is, an inversion of the sign bit 28 to shift it.

(7) The above steps (4), (5) and (6) are repeated (n−2) times.

(8) Finally, the positive or negative sign of the contents of the register 31 is decided and if negative, "0" is set to the least significant bit of the register 31 but if non-negative, "1" is set.

In this manner, the division can be executed and a quotient is stored in the shift register 29.

While in the prior art a shifter having a bit length which is twice a bit length of data standing for a divisor or dividend is needed, according to this invention it suffices that the bit length of the shifter 32 equals that of data standing for a divisor or dividend and also a direct path extending from the shifter 32 to the register can be dispensed with. Further, since the arithmetic and logic circuit 25 is allowed to always perform addition, hardware can be simplified.

Furthermore, the arithmetic and logic circuit 25, registers 26, 27 and 31 and shifter 32 constituting the present embodiment and used during execution of the division are usually provided precedently for the purpose of numerical calculation in a digital signal processor and the like and therefore, the arithmetic unit can advantageously be realized by adding only a slight amount of hardware including the shift register 29 and the multiplexer 30. Moreover, since hardware of the shift register 29 and multiplexer 30 can be the same for both the division and the Viterbi decoding as described above, efficient utilization of the operation circuit can be ensured to advantage.

In the present embodiment, the registers 26 and 27 to be read are switched by the sign bit 28 during execution of the division but in place of switching the registers 26 and 27 to be read, operations in the arithmetic and logic circuit 25 may be switched by the sign bit 28. In this case, if a result of the one preceding calculation is negative, addition is carried out but if positive, subtraction is carried out and the multiplexer 30 standing for the selection means is utilized only during the Viterbi decoding. A decision as to whether the calculation in the arithmetic and logic circuit 25 is addition or subtraction can be made later than controlling the registers 26 and 27 such that either one of them is read out. By utilizing this technique, the operation speed can be increased.

In the present embodiment, the multiplexer 30 is used to switch the registers 26 and 27 to be read in response to the sign bit 28. But, in place of selection by means of the multiplexer 30, the registers 26 and 27 to be read can be switched by controlling a read selection signal for the registers 26 and 27 when the registers 26 and 27 take a block configuration. In this case, the multiplexer 30 can be dispensed with and hence the hardware amount can be further reduced, contributing to reduction in costs and reduction in consumptive power.

According to the present invention, in addition to the above effects, the size of the shifter can be reduced and the direct path between the shifter and the register can be dispensed with in division. Also, the control circuit can be simplified to permit the division to be carried out with hardware reduced in size. Through this, the operational component can be reduced in size and consumptive power can be decreased. Further, since the division and Viterbi decoding can be performed with the same hardware, efficient utilization of the operation circuit can be ensured.

We claim:

1. An arithmetic unit comprising:

arithmetic means having a predetermined number of n bits and capable of controlling execution of either an addition or subtraction calculation by responding to a signal indicative of a positive or negative sign of a result of one preceding calculation;

first memory means for temporarily storing data delivered out of said arithmetic means;

second memory means of n bits for delivering calculation data to said arithmetic means;

a shift register of n stages for sequentially storing signals indicative of a positive or negative sign of results of calculation by said arithmetic means; and a shifter for shifting data of said first memory means by one bit to the left and inserting data of the most significant bit of said shift register into the least significant bit to provide an output which in turn is delivered to said arithmetic means.

2. An arithmetic unit comprising:

arithmetic means for performing addition of a predetermined number of n bits;

first memory means for temporarily storing data delivered out of said arithmetic means;

second and third memory means for storing calculation data;

selection means responsive to a signal indicative of a positive or negative sign of a result of calculation by said arithmetic means to select data from any one of said second and third memory means and to deliver the selected data to an input of said arithmetic means;

a shift register for sequentially storing signals indicative of a positive or negative sign of results of calculation by said arithmetic means; and a shifter for shifting data of said first memory means by one bit to the left and inserting data of the most significant bit of said shift register into the least significant bit to provide an output which in turn is delivered to said arithmetic means.

3. An arithmetic unit according to claim 2 wherein said second and third memory means are registers and said selection means is a multiplexer.

4. An arithmetic unit comprising:

a first memory for storing cumulative amount data of a predetermined number of n bits for selection of surviving paths;

a second memory for storing data of n bits indicative of a Hamming distance taken by each path in correspondence to a value of receiving series;

arithmetic means for performing first addition of a cumulative amount and a Hamming distance associated with one path, second addition of a cumulative amount and a Hamming distance associated with another path and subtraction between results of the first addition and second addition during Viterbi decoding, and for performing addition of a predetermined number of n bits during division based on a nonrestoring division algorithm;

first and second registers for temporarily storing results of calculation by said arithmetic means;

a third register for temporarily storing data delivered out of said arithmetic means during the division based on said nonrestoring division algorithm;

a shift register for temporarily storing n bits of data for selection of paths obtained as a result of subtraction between results of the first addition and second addition by said arithmetic means and stored in said first and second registers during Viterbi decoding and for sequentially storing signals indicative of a positive or negative sign of results of calculation by said arithmetic means during the division based on said nonrestoring division algorithm;

selection means for selecting any one of the first and second addition results in accordance with a sign of the selection data and delivering a new cumulative amount to said first memory during Viterbi decoding; and a shifter for passing data to said arithmetic means during Viterbi decoding and for shifting data of said third register by one bit to the left and inserting data of the most significant bit of said shift register into the least significant bit to provide an output which in turn is delivered to said arithmetic means during the division based on said nonrestoring division algorithm.

* * * * *